(12) United States Patent  
Dias Borgo et al.

(10) Patent No.: US 12,068,604 B2  
(45) Date of Patent: Aug. 20, 2024

(54) POWER MANAGEMENT DEVICE AND METHOD

(71) Applicant: SOLFACIL ENERGIA SOLAR TECNOLOGIA E SERVICOS FINANCEIROS LTDA, São Paulo (BR)

(72) Inventors: Guilherme Dias Borgo, Santana de Parnaiba (BR); Marcus Vinicius De Souza Alves, São Paulo (BR)

(73) Assignee: SOLFACIL ENERGIA SOLAR TECNOLOGIA E SERVICOS FINANCEIROS LTDA, São Paulo (BR)

( * ) Notice: Subject to any disclaimer, the term of this patent is extended or adjusted under 35 U.S.C. 154(b) by 0 days.

(21) Appl. No.: 18/057,841

(22) Filed: Nov. 22, 2022

(65) Prior Publication Data

US 2023/0163595 A1 May 25, 2023

(30) Foreign Application Priority Data

Nov. 23, 2021 (BR) ...................... 10 2021 023497-0

(51) Int. Cl.
*H02J 3/00* (2006.01)
*H02J 3/38* (2006.01)
*H02J 7/00* (2006.01)

(52) U.S. Cl.
CPC .............. *H02J 3/007* (2020.01); *H02J 3/381* (2013.01); *H02J 7/00032* (2020.01);
(Continued)

(58) Field of Classification Search
CPC .... H02J 3/007; H02J 7/00032; H02J 7/00309; H02J 3/38; H02J 3/381; H02J 7/0047;
(Continued)

(56) References Cited

U.S. PATENT DOCUMENTS

2013/0035802 A1    2/2013  Khaitan et al.
2015/0333657 A1*  11/2015  Allert ........................ H02J 3/26
                                                                                307/18

FOREIGN PATENT DOCUMENTS

| CN | 202940632 U | 5/2013 |
| CN | 110797967 A | 2/2020 |
| CN | 108695889 B | 8/2021 |

* cited by examiner

*Primary Examiner* — Robert L Deberadinis
(74) *Attorney, Agent, or Firm* — POLSINELLI PC

(57) ABSTRACT

The present invention relates to an electrical power management device (300) capable of preventing or allowing the passage of current to a power grid (70). The present invention also relates to an electrical power management method (400). Particularly, the device (300) of the present invention is capable of performing electrical data telemetry and reporting it to a control center. The device (300) receives, from a power generation system (50), a source of alternating current through a power grid circuit (80), wherein the device (300) comprises: a control unit (10); a data transmission and reception module (20) configured to receive an external command signal; and at least one switching element (30*a*, 30*b*); the control unit (10) being adapted to actuate the at least one switching element (30*a*, 30*b*) so as to selectively open and close the power grid circuit (80) upon receipt of the external command signal to enable or prevent the passage of alternating current.

19 Claims, 4 Drawing Sheets

(52) U.S. Cl.
CPC ........ *H02J 7/00309* (2020.01); *H02J 7/0047* (2013.01); *H02J 7/0063* (2013.01); *H02J 2300/24* (2020.01); *H02J 2300/28* (2020.01)

(58) Field of Classification Search
CPC .. H02J 7/0063; H02J 2300/28; H02J 2300/24; H02J 7/00; H02J 3/00
See application file for complete search history.

80

80

POWER MANAGEMENT DEVICE AND METHOD

CROSS-REFERENCE TO RELATED APPLICATIONS

This application claims priority to Brazilian Patent Application No. 10 2021 023497-0, filed on Nov. 23, 2021, entitled "POWER MANAGEMENT DEVICE AND METHOD," the entirety of which is herein incorporated by reference.

FIELD OF INVENTION

The present invention relates to an electrical power management device capable of preventing or allowing the passage of current to a power grid. The present invention also relates to an electrical energy management method. Particularly, the device of the present invention is capable of performing electrical data telemetry and reporting it to a control center.

BACKGROUND OF THE INVENTION

In the fields of sustainable energy, particularly photovoltaic energy, it is possible to observe the growing demand for solutions that enable the wide implementation of photovoltaic panel systems in commercial and residential environments, particularly for solutions that facilitate user's control over the power grid in a quick, comfortable and safe manner.

This demand occurs because photovoltaic power generation systems for homes and commercial establishments are usually isolated systems from the electrical distribution network (off-grid), incorporated into the power distribution grid (on-grid) or hybrid (on-grid and off-grid), where photovoltaic panels work together with the residential, commercial and public power distribution grid, as well as together with batteries, in order to ensure that energy production that exceeds the capacity of use of the residence or establishment is stored in batteries for later use or sent to the public grid, generating monetary support from the electricity distributor to the contributing user.

In addition, power generation systems, in general, contribute to the provision of electrical power to residence or commercial establishment at all times. This creates the need to manage the times when the power generation system is turned on and/or turned off. However, to be increasingly encouraged and desired by users, this management of the power grid must be something comfortable and convenient for the user, so as not to discourage the use of renewable energies.

In this sense, there are several solutions present in the state of the art of the electronic field that aim at the management of electrical energy produced by power generation systems, but none of them aims:
- detecting the occurrence of by-pass in the power grid circuit, and alerting a control center when the by-pass is detected, wherein the detection of the by-pass occurrence is based on an anti-islanding protection of an inverter;
- the outlet of alerts to the control center in the event of a discharge of a battery that supplies an electrical power management device;
- the reception by the electrical power management device of updates to a set of instructions stored in a machine-readable memory, sent by the control center, via an OTA (Over-The-Air) mechanism; and
- magnetic sensors present in the electrical power management device to detect and report to the control center, attempts to tamper with electrical telemetry sensors, which obtain data measurements from the power grid circuit, calculate mean values for each data of the power grid circuit and transmits them through a data transmission and reception module to the control center.

For example, document CN 202940632 U discloses an automatic switching system that uses short message service (SMS) to control the actuation of a relay that allows or stops the supply of electrical power from a photovoltaic power generation system to a circulation system of a swimming pool but it fails to reveal the technical characteristics mentioned above.

Furthermore, document CN 110797967 A discloses a control system for energy saving of a photovoltaic power station, in which a microcontroller is controlled by a mobile phone by means of a signal from the Global System for Mobile Communications (GSM). However, it also fails to reveal the technical features mentioned above.

In turn, document CN 108695889 B discloses an inverter of a photovoltaic system capable of communicating with a server and sending data related to its operation through a Wi-Fi module or a General Packet Radio Service module (GPRS). This document also fails to reveal the technical features mentioned.

Finally, document US 2013/0035802 A1 is the closest state of the art to the present invention, and discloses a power management device and system, wherein a central controller comprises a GSM module for communicating with a remote central server. This document further discloses a device housing that has means for alerting the remote central server when the housing is opened by an unauthorized individual, as well as revealing means for detecting power theft or tampering with a device meter. However, similarly to the prior art documents listed above, such document does not anticipate the mentioned technical characteristics.

As can be seen, none of the above mentioned prior art documents provide means to: detect the occurrence of by-pass in the power grid circuit, and alert the control center when the by-pass is detected, wherein the detection of the by-pass occurrence is based on anti-islanding protection of the inverter; output alerts to the control center in case of discharge of the battery that supplies the electrical power management device; receive, by the electrical power management device, updates of a set of instructions stored in a machine-readable memory, sent by the control center, via OTA (Over-The-Air) mechanism; and fail to reveal or make obvious to the person skilled in the art, magnetic sensors present in the electrical power management device to detect and report to the control center, attempts to tamper with electrical telemetry sensors, which obtain data measurements from the power grid circuit, calculate mean values for each data of the power grid circuit and transmit them through a data transmission and reception module to the control center.

In view of the above, it is clear that the state of the art lacks technological improvements in the electronic field to manage the distribution of electrical power from a power generation system.

OBJECTS AND DESCRIPTION OF THE INVENTION

Therefore, a general object of the present invention is to provide an electrical power management device capable of eliminating or at least reducing the limitations currently known in the state of the art.

A particular object of the present invention is to provide a device capable of being selectively actuated for allowing or preventing the passage of alternating current from an inverter of a power generation system to a power grid.

Another particular object of the present invention is to provide a device capable of detecting and reporting attempts to tamper with the device, as well as attempts to tamper with the device itself and the by-pass of electrical power from a power grid circuit, wherein the detection of by-pass is based on an anti-islanding protection of the inverter.

Another particular object of the present invention is to provide a device capable of outputting alerts to a control center in case of discharge of a battery that supplies the electrical power management device.

Another particular object of the present invention is to provide a device capable of receiving updates of a set of instructions stored in a machine-readable memory, sent by the control center, via OTA (Over-The-Air) mechanism.

Furthermore, a particular object of the present invention is to provide magnetic sensors in the device for detecting and reporting to the control center, attempts to tamper with electrical telemetry sensors, which obtain data measurements from the power grid circuit, calculate mean values for each data of the power grid circuit and transmits them through a data transmission and reception module to the control center.

Additionally, it is a general object of the present invention to provide an electrical power management method capable of eliminating or at least reducing the limitations currently known in the state of the art.

A particular object of the present invention is to provide a method for selectively driving an electrical power management device to allow or prevent the passage of alternating current from an inverter of a power generation system to a power grid.

Another particular object of the present invention is to provide a method for detecting and reporting attempts to tamper with the device, as well as attempts to tamper with the device itself and the by-pass of electrical power from a power grid circuit, wherein the method of detecting the by-pass is based on an anti-islanding protection of the inverter.

Another particular object of the present invention is to provide a method for outputting alerts to a control center in the event of a discharge of a battery that supplies the electrical power management device.

Another particular object of the present invention is to provide a method for sending updates of a set of instructions stored in a machine-readable memory through the control center, to the device via an OTA (Over-The-Air) mechanism.

In addition, a particular object of the present invention is to provide a method for detecting and reporting to the control center, attempts to tamper with the electrical telemetry sensors of the device.

One or more of the above-mentioned objects of the present invention, among others, is (are) achieved by means of an electrical power management device for an electrical power generation system, the electrical power generation system providing a source of alternating current to the device via a power grid circuit, the device comprising:
- a control unit;
- a data transmission and reception module configured to receive an external command signal;
- at least one switching element;
- the control unit being adapted to drive the at least one switching element so as to selectively open and close the power grid circuit upon receipt of the external command signal to allow or prevent the passage of alternating current.

One or more of the above-mentioned objects of the present invention, among others, is (are) also achieved by means of an electrical power management method, of an electrical power generation system, the electrical power generation system providing a source of alternating current to a power management device via a power grid circuit, the method comprising the step of:
- selectively opening and closing the power grid circuit upon receipt of an external command signal, to allow or prevent the passage of alternating current.

BRIEF DESCRIPTION OF THE DRAWINGS

The objects, technical effects and advantages of the present invention will be apparent to those skilled in the art from the following detailed description which makes reference to the accompanying figures, which illustrate exemplary but not limiting embodiments of the claimed objects:

DESCRIPTION OF THE INVENTION EMBODIMENTS

Figure 1:
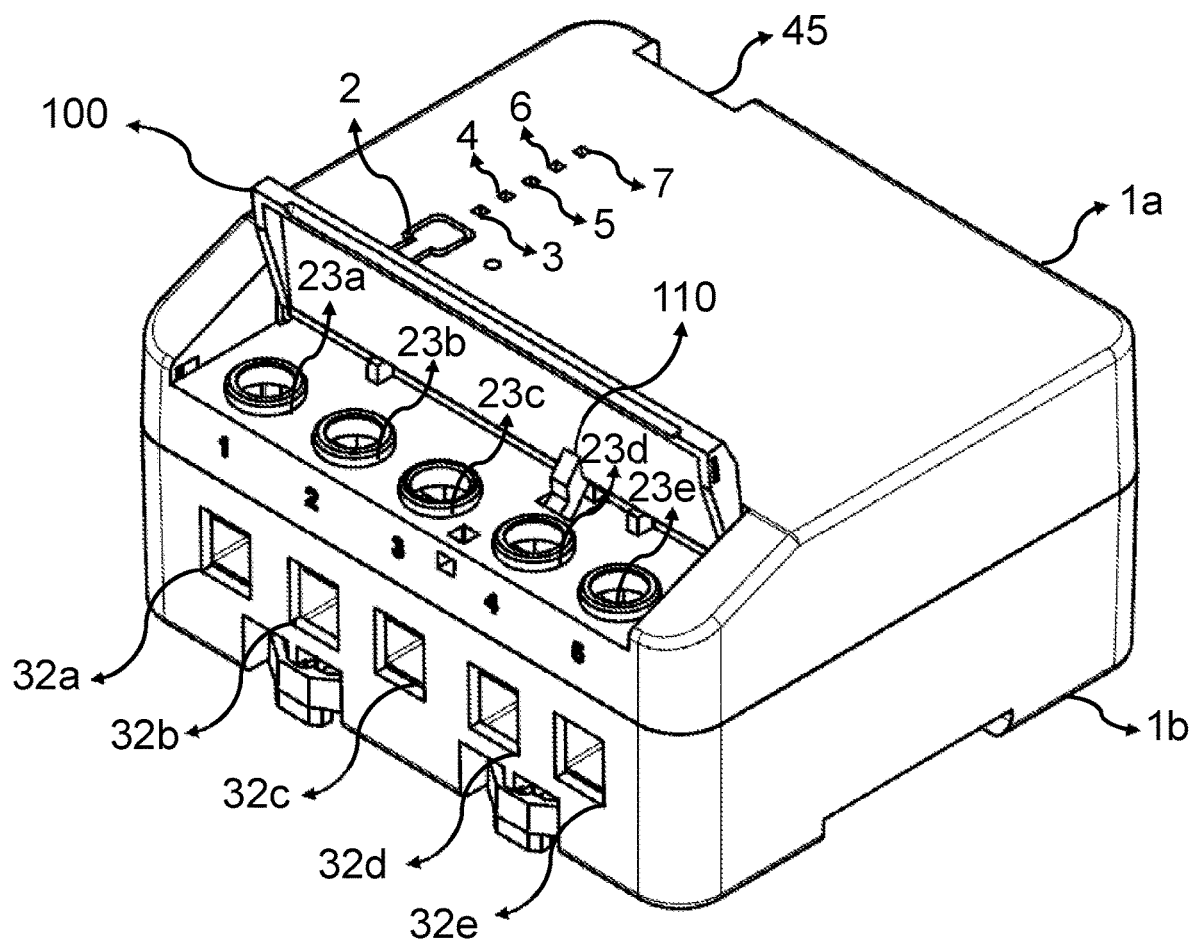
FIG. 1 illustrates an isometric view of the power management device 300, according to an embodiment of the present invention.

Initially, it should be noted that the device 300 and the method 400 of the present invention will be described below according to particular, but not limiting, embodiments, since their embodiments may be carried out in different ways and variations and according to the application desired by the person skilled in the art.

In one embodiment, the present invention discloses an electrical power management device 300 capable of selectively preventing or allowing the flow of current from an electrical power generation system 50 to a power distribution grid 70, in addition to obtaining data measurements from the power grid circuit 80 and transmitting them through a data transmission and reception module 20 to a control center.

In another embodiment, the present invention discloses an electrical power management method 400 which comprises means for preventing or allowing the flow of current from an electrical power generation system 50 to a power distribution grid 70, means for obtaining data measurements from the power grid circuit 80 and transmitting it through the data transmission and reception module 20 to the control center, in addition to comprising means for updating a set of instructions in a machine-readable memory present in the power management device 300 through the control center via OTA (Over-The-Air) mechanism.

In the context of the present invention, the term "electrical power generation system 50" preferably refers to a photovoltaic power generation system 50 that is part of a power grid circuit 80. However, the term may be also understood as a wind power generation system 50 or any electrical power generation system 50 whose device 300 and method 400 are capable of being applied.

Furthermore, the term "power grid circuit 80" refers to a power grid 80 comprised by the electrical power generation system 50 and a residential power distribution grid 70 or public power distribution grid 70. In this sense, the power generation system 50 is preferably an on-grid system. However, it will be apparent to one skilled in the art that the device 300 and the method 400 in accordance with the present invention could also be applied to an off-grid system.

Furthermore, the electrical power management device 300, according to the present invention, is adapted to manage electrical power in alternating current, coming from an inverter 60 of the electrical power generation system 50. However, the person skilled in the art will understand that the device 300 of the present invention can be implemented, once the minimum changes are made, in order to receive direct current, that is, to be positioned upstream of the inverter 60.

In turn, the term "control center" refers to a server, preferably remote, but in some embodiments of the present invention, it may also be a local server, intended, in both embodiments, to receive and record data from the power grid circuit 80 transmitted by the device 300 through data transmission and reception module 20, in addition to sending the updates of the set of instructions to the device 300.

In a preferred embodiment, and as can be seen through FIGS. 1 and 2, the electrical power management device 300 comprises an advantageously compact housing consisting of an upper portion 1a and a lower portion 1b, which are preferably made of polymeric material and joined by means of screws, pins, or any other fastening element, in which the housing holds the electronic components of the device 300, which will be described below.

The lower portion 1b of the housing of the electrical power management device 300 comprises a rail fitting according to DIN-IEC/EN 60715, allowing its installation in switchboards or its fixing on a wall. In a preferred embodiment, the device housing comprises degree of protection IP30, in accordance with the requirements of the International Electrotechnical Commission, however, in alternative embodiments, the housing may present different degrees of protection. In any embodiment, the device should preferably be sheltered from weather such as precipitation, excessive humidity and UV radiation.

The electrical power management device 300 further comprises a communication port 45 for receiving updates, commands and debugging of the set of instructions stored in the machine-readable memory present in the device 300, in case of impossibility of carrying out such updates through the OTA (Over-The-Air) mechanism sent by the control center to the device via internet signal.

As previously mentioned, the electrical power management device 300 is adapted to operate on a power grid circuit 80, wherein the power grid circuit 80 comprises a power generation system 50, and a power distribution grid 70. In in a preferred embodiment, the power generation system 50 is a photovoltaic power generation system 50. In other embodiments, the power generation system 50 is a wind power generation system 50. In both embodiments, the power generation system 50 converts energy from a first source into direct current DC electrical power, which is transmitted to an inverter 60, which is part of the power generation system 50. The inverter 60 is responsible for inverting direct current DC into alternating current AC, to be later distributed to the power distribution grid 70.

Figure 3A:
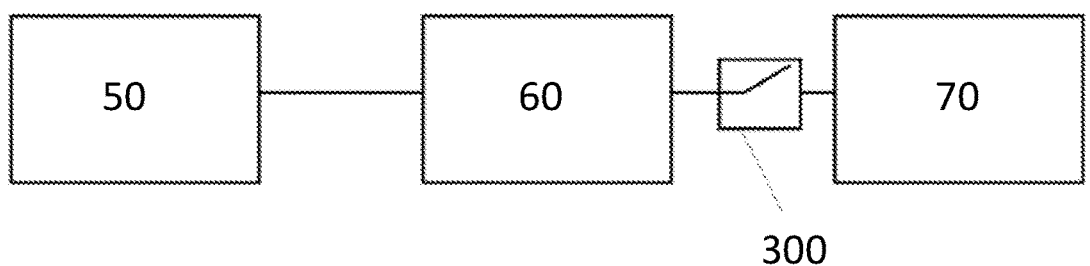
FIG. 3a illustrates a chart of the operation of the device 300 in a power generation system 50, when the control unit 10 actuates the at least one switching element 30a, 30b in order to open the power grid circuit 80, as one embodiment of the present invention.
Figure 3B:
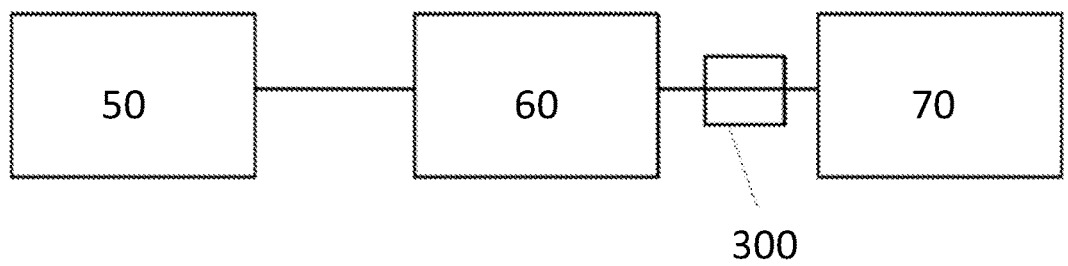
FIG. 3b illustrates a chart of the operation of the device 300 in a power generation system 50, when the control unit 10 actuates the at least one switching element 30a, 30b in order to close the power grid circuit 80, as one embodiment of the present invention.

In a preferred embodiment, and as can be seen through FIGS. 3a and 3b, the electrical power management device 300 is positioned, in series, between the inverter 60 and the power distribution grid 70, to receive a source of alternating current AC, and selectively allowing or preventing the passage of said current to the power distribution grid 70. In an alternative embodiment, the device 300 may be installed in parallel with the inverter 60 and the power distribution grid 70. In yet another alternative embodiment, the device 300 can act to allow or prevent the flow of current, for example to a battery, in order to ensure that the energy production that exceeds the utilization capacity of the power grid circuit 80 is stored for later use or sent to the public network. In any embodiment described herein, the device 300 is capable of operating in a single-phase, two-phase, or three-phase system.

Figure 2:
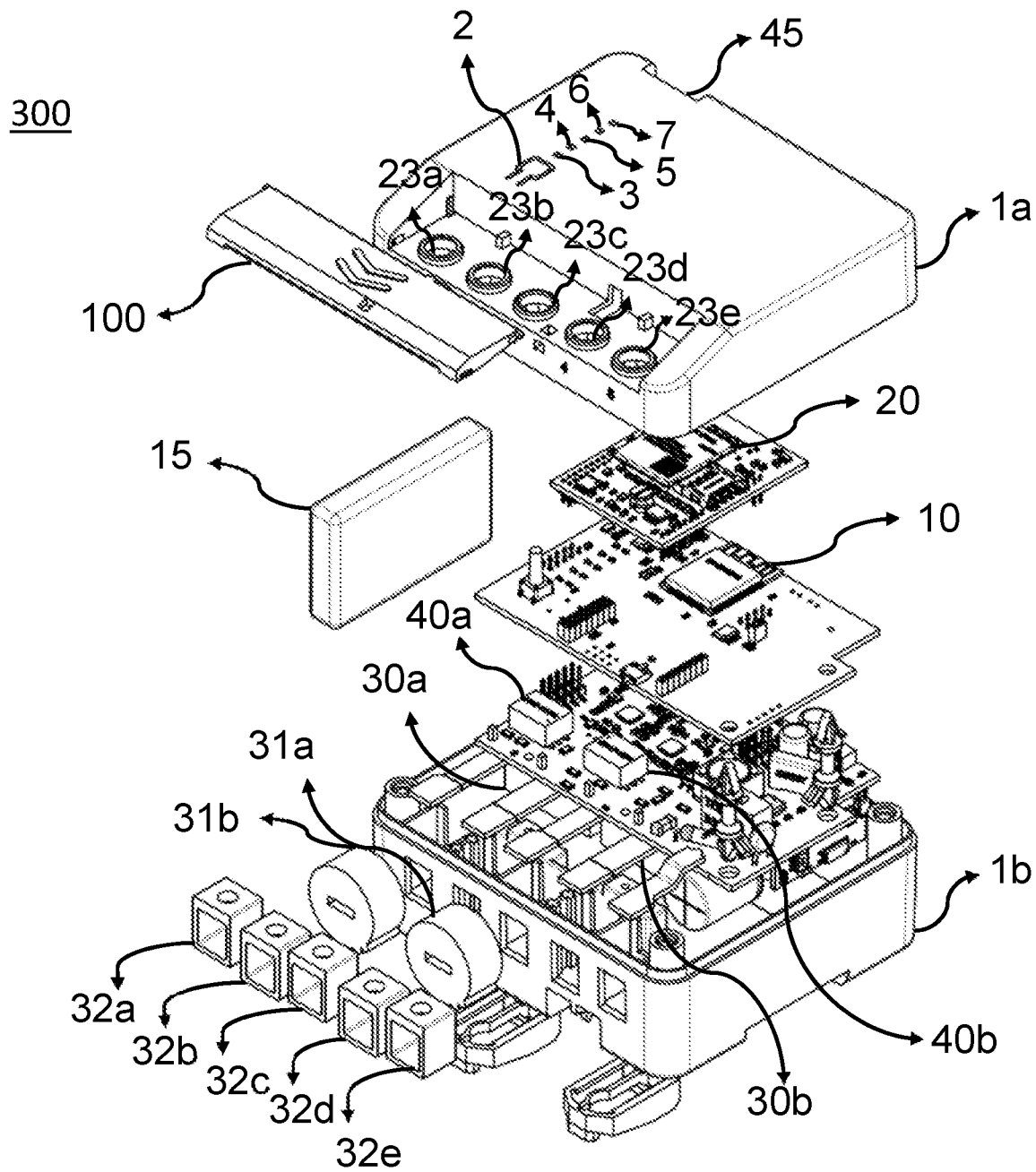
FIG. 2 illustrates an exploded view of the power management device 300, and its main constituent parts, according to one embodiment of the present invention.

For this purpose, and as can be seen in FIGS. 1 and 2, the device comprises a plurality of inputs for electrical connections 32a, 32b, 32c, 32d, 32e adapted to receive the electrical power conductor cables from the output of the inverter 60 and the electrical power conductor cables from the power distribution grid 70. Specifically, the inputs 32a and 32c are adapted to respectively receive the electrical power conductor cables of phase 1, coming from the inverter 60, while the inputs 32b and 32d are adapted to respectively receive the electrical power conductor cables of phase 2 from the power distribution grid 70. In turn, the input 32e is adapted to receive a neutral cable.

So that the electrical power conductor cables are received by the respective inputs for electrical connections 32a, 32b, 32c, 32d, 32e, said inputs are comprised of electrical contact terminals 32a, 32b, 32c, 32d, 32e, adapted to firmly secure the electrical power conductors and to avoid bad contact between the conductors and the electrical contact terminals 32a, 32b, 32c, 32d, 32e, preventing them from overheating during the device 300 operation. For securing the electrical power conductor cables, the device 300 comprises a plurality of accesses to electrical connections 23a, 23b, 23c, 23d, 23e, preferably located above the inputs for electrical connections 32a, 32b, 32c, 32d, 32e, in order to allow a user insert fastener element such as screws or pins.

The device 300 further comprises a protective cover 100, adapted to protect the access to electrical connections 23a, 23b, 23c, 23d, 23e and prevent an unauthorized individual from unplugging the electrical power conductor cables from the electrical connection inputs 32a, 32b, 32c, 32d, 32e after installation and homologation of the device 300 by authorized personnel. In a preferred embodiment, the protective cover 100 is a hinged cover adapted to be opened at an angle of approximately 90° to its closed and locked position. In both positions, the protective cover 100 is adapted to remain attached to the device 300. In addition, the protective cover comprises tamper detection means, which will be described later in the section "Fraud and Tamper Detection Means".

As can be seen in FIG. 2, the electrical power management device 300 comprises at least one switching element 30a, 30b associated with at least one current transformer 31a, 31b, to ensure safe operation of the switching elements 30a, 30b, since they are in direct contact with the electrical contact terminals 32a, 32b, 32c, 32d, 32e, and therefore, in direct contact with the electrical power conductor cables of phase 1, coming from the inverter 60 and with the conductor cables of the electrical power of phase 2 coming from the power distribution grid 70. The at least one switching element 30a, 30b is secured, preferably soldered, to a lower portion of a first printed circuit board. In turn, the neutral cable is in contact with a terminal secured, preferably welded, to the first printed circuit board.

In a preferred embodiment, the at least one switching element 30a, 30b is a latch type electromechanical relay. Latch type relays 30a, 30b, unlike normally open or closed relays, maintain their state until another command is sent, regardless of their power supply. Therefore, the present invention advantageously uses latch type relays 30a, 30b, since in case of failure of the device 300, the power grid circuit 80 will maintain its previous state instead of unduly deactivating the power generation system 50. This is a technical advantage of the present invention, considering that an unexpected shutdown can cause damage to the power generation system 50.

In a preferred embodiment, the at least one latch type relay 30a, 30b supports an electrical current of up to 80 Amps and an electrical voltage of up to 250 Volts, wherein the coil of the at least one latch type relay 30a, 30b is actuated by a 5 Volt electrical signal originating from a transistor-based driver circuit. In an alternative embodiment, the at least one latch type relay 30a, 30b supports an electrical current of up to 100 Ampere. Other embodiments comprising changes in the value of electrical current and voltage supported by the device 300 will also be apparent to those skilled in the art upon reading this specification.

The at least one latch type relay 30a, 30b has control ports connected to a control unit 10 secured to a second printed circuit board. In a preferred embodiment, the control unit 10 is a processor 10, wherein, when it is desired to actuate the at least one latch type relay 30a, 30b, the electrical signal is sent by the processor 10, biasing transistors, and forcing circulation of electric current in the coil of the at least one relay 30a, 30b, causing a change of state.

When the at least one relay 30a, 30b is actuated in order to close the power grid circuit 80, the set of instructions stored in the machine-readable memory causes the processor 10 to simultaneously carry out the actuation of the device 300, if the same is disabled. Similarly, the set of instructions is capable of preventing the device 300 as a whole from being disabled when the relays 30a, 30b are actuated in order to open the power grid circuit 80.

In a preferred embodiment, the device comprises the data transmission and reception module 20 fixed to a third printed circuit board, configured to receive an external command signal, being an actuation command of the at least one relay 30a, 30b. This external command signal can be issued via a control center, by a command via internet connection, or via an SMS signal or telephone call made by an authorized mobile number. For this purpose, the external command signal is based on at least one of GSM, LTE 4G, CatM1, Nb-IoT and Wi-Fi. The device 300 may further comprise MESH connection with other devices that communicate via a Wi-Fi, Bluetooth or Bluetooth LE network.

When the external command signal is based on an SMS signal or a telephone call made by an authorized mobile number, the data transmission and reception module 20 has a SIM card adapted to receive the SMS signal or the call. The data transmission and reception module 20 checks whether the mobile number has authorization, and if so, it sends the external command signal to the processor 10, which actuates the at least one relay 30a, 30b as mentioned above. Although the device 300 comprises IoT technology, this embodiment has the advantage of being independent of an internet connection for the relay to be actuated 30a, 30b.

As illustrated in FIG. 2, the device further comprises a plurality of electrical telemetry sensors 40a, 40b attached to the first printed circuit board to obtain measurements of power grid circuit data 80, calculate mean values for each power grid circuit data 80 and transmit them through the data transmission and reception module 20 to the control center in order to monitor the behavior of the grid.

In a preferred embodiment, the electrical telemetry sensors 40a, 40b are STPM33 sensors, wherein each electrical telemetry sensor 40a, 40b has one channel for measuring electrical phase voltage and two channels for measuring electrical current. In this way, only one of them is used for measuring electric current. Approximately every 2 seconds, a reading of the values measured by the electrical telemetry sensors 40a, 40b is performed and if there is any failure in the reading, the electrical telemetry sensors 40a, 40b are reset. Otherwise, the mean values for each data are calculated. Finally, in a 5-minute cycle, the device 300 generates a telemetry message comprising the calculated mean values and sends it through the data reception and transmission module 20 to the control center.

In a preferred embodiment, the data includes one or more of: voltage values per phase; electric current values per phase; active power values per phase; reactive power values per phase; apparent power values per phase; period, and frequency of power grid circuit 80; phase shift between current and voltage; and power factor.

The device 300 advantageously comprises a plurality of magnetic sensors for detecting and reporting attempts to tamper with the electrical telemetry sensors 40a, 40b. Magnetic sensors will be described in detail in the section "Means of detecting fraud and tampering".

In a preferred embodiment, the device 300 continuously monitors other critical quantities for its operation, such as the level of a battery 15 that powers the device 300 and the temperature value of the electrical connections 32a, 32b, 32c, 32d, 32e. This data is processed through analog-to-digital converters and communicated to the processor 10, while monitoring is implemented by the set of instructions.

As it is an electrical measurement equipment that operates under high levels of electrical current, a critical point of the device 300 is the safety of operation. In order to mitigate the risks associated with operating at high temperatures, empirical tests were conducted, and it was found that the critical temperature point occurs at the electrical connection terminals 32a, 32b, 32c, 32d, 32e, if the conductor cables are not properly fixed.

Therefore, and in a preferred embodiment, the device 300 comprises temperature sensors, specifically negative voltage coefficient thermistors for monitoring the temperature of electrical connections 32a, 32b, 32c, 32d, 32e. For this, the processor 10 is adapted to, in an interval of 30 microseconds, performing a plurality of measurements of a phase voltage value detected by the thermistors. The performance of the plurality of measurements is intended to debug fluctuations or variations in phase voltage levels at the port of analog-to-digital converters. Afterwards, the processor 10 calculates an arithmetic mean value of the phase voltage and such mean is calibrated.

After the process described above, a voltage value proportional to the temperature is obtained, which is then converted to a temperature scale, preferably to the centigrade scale. The processor 10 then compares the converted value with a temperature range that corresponds to a maximum value, preferably 80° C., where there would be risks to the device 300 in case of operation at this value or above, and a minimum value, preferably 65° C., where the operation is tolerable. If the converted value is within the temperature range, the processor 10 triggers a timer to monitor variations of the converted value, within the range, at or above the maximum value of the range, and at the end of the timer, if the converted value is within the range, at or above the maximum value of the range, the processor 10 actuates the data transmission and reception module 20 to send an overheating signal to the control center.

Thus, the use of the timer is advantageous as it serves as a redundancy system to prevent an oscillation or random value from causing the processor 10 to actuate the data transmission and reception module 20 to send a false overheating signal to the control center.

Since the resistivity curve of the thermistors is not linear, the processor 10 advantageously monitors and actuates the data transmission and reception module 20 to send the overheating signal to the control center, based directly on the phase voltage value, in order to avoid errors arising from the conversion process.

As previously discussed, the device 300 can be selectively powered, either by the battery 15 or by a source from the power grid circuit 80. By default, the device is powered by the source, but in the event of a power failure event, the processor 10 will be able to drive the battery 15 to power the device 300 and guarantee that it will continue in communication with the control center. For this to occur, the device 300 provides a circuit with an opto-coupler sensor that communicates with the processor 10, sending a signal when detecting the presence or absence of phase voltage in the power grid circuit 80, and thus verifying the event of blackout. The circuit with the opto-coupler sensor is advantageous as it guarantees galvanic isolation, increasing the safety of operation of the device 300 and any other device that is connected to the device 300 through the communication port 45.

The opto-coupler sensor has an output that is directly associated with a processor port 10, and operates in such a way that, if there is a potential difference in the power grid circuit 80, there will be electrical current circulating between the photodiodes of the opto-coupler sensor. In turn, the photodiodes emit light so as to polarize the base of a photo transistor, which in turn will polarize a transistor, which will send a signal to the processor port 10, which will be at a low logic level. In the case of absence of phase voltage in the power grid circuit 80, the signal will not be sent, and said port will be at a high logic level.

Analogously to monitoring the temperature of the electrical connections 32a, 32b, 32c, 32d, 32e, the processor 10 is adapted to, at a time interval, perform a plurality of port checks to identify logic level variations. Carrying out the plurality of checks is intended to debug fluctuations of logic level variations.

At the end of the verification, if the logic level on the port is low, the processor 10 triggers a timer to monitor variations in the logic level, and at the end of the timer, if the logic level remains low, the processor 10 actuates the battery 15 to power the device 300, changes the device 300 to a low-power mode, in addition to actuating the data transmission and reception module 20 to send a power failure signal to the control center.

In this way, the use of the timer is advantageous as it serves as a redundancy system to avoid causing the processor 10 to actuate the data transmission and reception module 20 to send a false power failure signal to the control center.

In low power mode, the battery 15 is capable of keeping the device operating for at least 60 days. The low power mode allows the processor 10 to enter a sleep state, disabling all device peripherals except for a second, ultra-low-power processor and an RTC memory area. When in low power mode, the current drawn from the battery 15 achieves the order of 60 µA in order to meet the operation of the device 300 in this operating mode. The device 300 will leave low power mode upon detection of the presence of phase voltage in the power grid circuit 80 by the opto-coupler.

For monitoring the level of the battery 15, the device 300 comprises a voltage divider circuit in order to measure the voltage value of the battery 15. In a similar way to monitoring the temperature of the electrical connections 32a, 32b, 32c, 32d, 32e, the processor 10 is adapted to, in a time interval, performing a plurality of measurements of the voltage value of the battery 15, when the direct current voltage is less than 4.3V. In this way, the processor works under the logic that, when the device 300 is powered by the source, the voltage value of the battery 15 will be 4.4V, that is, the battery 15 is not being drained.

The performance of the plurality of measurements is intended to debug fluctuations or variations in voltage levels at the port of analog-to-digital converters. Afterwards, the processor 10 calculates an arithmetic mean value of the voltage and this mean is calibrated. The processor 10 takes into account the value of resistors in the voltage divider circuit so as to multiply the voltage value obtained by a conversion factor in order to obtain the true voltage value of the battery 15.

The mean voltage value is then compared with the value of 4.4V, which is a first voltage threshold of the battery 15, in order to verify that the device is being powered by the battery 15. If the mean voltage value is below the first voltage threshold, and below a second voltage threshold, lower than the first, the processor 10 triggers a timer to monitor variations in the mean voltage value. At the end of the timer, if the mean voltage value is below the second voltage threshold, the processor 10 actuates the data transmission and reception module 20 to send a battery discharge signal 15 to the control center.

Means of Fraud and Tamper Detection

In a preferred embodiment, the device 300 comprises means for detecting fraud in the power grid circuit 80 and means for detecting tampering with the protective cover 100. By detecting fraud in the power grid circuit 80, it is meant the occurrence of by-pass in the power grid circuit 80, which is characterized by a direct connection between the electrical power conductor cables associated with the device 300, in order to circumvent the opening and closing of the power grid circuit 80 by the actuation of at least a relay 30a, 30b.

For the by-pass being detected, the processor 10 is responsible for implementing a routine for monitoring an electrical reference value at the output of the device 300, which is advantageously based on an anti-islanding protection of the inverter 60. In other words, the processor 10 is based on the fact that the inverter 60, when connected to the power grid circuit 80, will not work in case of loss of electrical reference, that is, in case of power grid circuit 80 opening caused by the actuation of at least one relay 30a, 30b. In this sense, when actuating the at least one relay 30a, 30b to open the power grid circuit 80, the inverter 60 will have no electrical reference, and its anti-islanding protection will force its shutdown.

Once the at least one relay 30*a*, 30*b* has been actuated to open the power grid circuit 80, and the inverter 60 is off, there should not be an electrical reference value recorded at the output of the device 300, such as voltage, current or electrical power. In a preferred embodiment, the electrical reference value monitored by the processor 10 is electrical voltage. In one embodiment that the electrical power generation system 50 is a photovoltaic power generation system 50, the monitoring routine of the electrical power reference is implemented by the processor 10 every day, at night, when the electrical power generation system is photovoltaic 50 does not convert energy, which makes the actuation of at least one relay 30*a*, 30*b* safer.

In a preferred embodiment, the routine of monitoring the electrical voltage at the output of the device 300 is based on a threshold, above which, the occurrence of by-pass in the power grid circuit 80 is detected by the processor 10, which actuates the data transmission and reception module 20 to send a bypass signal to the control center. In a preferred embodiment, the threshold is at most 50 V, in order to avoid sending a false bypass signal.

On the tamper detection means of the protective cover 100, and as illustrated in FIG. 1, the device 300 comprises a flange 110, which is forced downwards when the protective 100 changes from an open state to a closed state. The flange 110 is associated with a protection circuit, and the protection circuit is in communication with the processor 10. When forced downwards, the flange 110 closes the protection circuit, which communicates a low logic state to the processor 10.

Then, the processor 10 continuously monitors the condition of the protection circuit, and if the protection cover 100 is opened, the flange 110 returns to its original position, consequently opening the protection circuit. In this event, the protection circuit communicates a high logic level state to the processor 10, which in turn actuates the data transmission and reception module 20 to send a tamper signal from the device 300 to the control center.

After sending the tamper signal from the device 300 to the control center, the equipment will enter into a tampered operating mode, and will not return to the normal operating mode if the cover 100 is closed again. The return of the device 300 to the normal operating mode will only occur upon sending a command to restore the device 300 by the control center. As long as it remains in tampered operating mode, the device will continue to send telemetry messages.

Other means of fraud include tampering with electrical telemetry sensors 40*a*, 40*b* by malicious individuals in order to slow or stop the accumulation of energy usage statistics in an attempt to lower their electricity bill. In this regard, one method used by such individuals is the placement of an electrical conductor, such as a metal object, between electrical connections 32*a*, 32*b*, 32*c*, 32*d*, 32*e* of a given phase. This electrical conductor forms a current divider with a current sensing circuit, which causes the metal object to bypass current flow, such that electrical telemetry sensors 40*a*, 40*b* detect less electrical current than what is actually consumed, thus reducing active energy readings and total cumulative energy readings.

Furthermore, individuals expose themselves to serious risks when attempting this means of fraud, due to the grid voltage. In this sense, the protection cover 100 is the first line of defense against this type of fraud.

Another method used by such individuals is the application of an electromagnetic field under the device, by means of a magnet, in order to fake the readings of the electrical telemetry sensors 40*a*, 40*b* and affect other internal components.

As mentioned above, the present invention advantageously further provides a second line of defense for this type of fraud, as it comprises a plurality of magnetic sensors for detecting and reporting attempts to tamper with electrical telemetry sensors 40*a*, 40*b*.

In a preferred embodiment, the magnetic sensors are hall effect sensors for detecting strong magnetic fields in three dimensions. These sensors are omnipolar, thus, they must detect that the south and north poles of a magnet are being applied close to them. The sensors are embedded in or external to the processor 10, and preferably have a magnetic flux density operating point of plus or minus 6.9 mT.

Therefore, whenever the detected magnetic field exceeds this range, the outputs of the hall effect sensors will be reduced and once the detected magnetic field falls within a range of plus or minus 3.5 mT, the outputs will be higher. Optionally, upon detecting the occurrence of fraud, the processor 10 may actuate the data transmission and reception module 20 to send a tampering signal from the electrical telemetry sensors 40*a*, 40*b* to the control center.

In addition, another advantage of the sensors is that they have open drain outlets. This allows the output of multiple hall effect sensors to be combined just by directly connecting them. Therefore, if only one of the hall effect sensors detects a magnetic field, the shared output will be reduced to indicate that a magnetic field has been detected. It is also possible to detect which hall effect sensor has detected a magnetic field, by ensuring that only one hall effect sensor is on at a time and associating the output at a given time with the hall effect sensor that has been actuated.

In a preferred embodiment, hall effect sensors are positioned on each current transformer 31*a*, 31*b*. Hall effect sensors can further be powered by battery 15 if there is a power failure.

In addition to telemetry messages, device tamper signal 300, battery discharge signal 15, status of at least one relay 30*a*, 30*b*, power failure signal, electrical connections overheat signal 32*a*, 32*b*, 32*c*, 32*d*, 32*e* and bypass signal in the power grid circuit 80, the data transmission and reception module 20 also sends to the control center:

data from the device 300, such as the sequential index of messages and signals sent to the control center; the unique device identifier 300, assigned after provisioning on the production line; the set of instructions version;

general state data of the device 300, such as the Mac Wi-Fi address of the processor 10; processor core temperature 10; the temperature of the data transmission and reception module chipset 20;

data from the GSM network and from the data transmission and reception module 20, such as the signal strength of the mobile data network; the unique IMEI identifier of the module 20; the unique identifier of the SIM card; name of the data carrier the device 300 is connected to; the telephone number authorized to send commands to the device 300; the device's IP address 300;

geolocation data of the device, received, preferably via a GNSS antenna, or via a Location Based Service (LBS) geolocation system, or even through a system of triangulation and measurement of the intensity of radio signals from Transceiver base Stations (BTS) and including universal time collected from the mobile data network; latitude and longitude data of the device 300 installation location; the number of satellites observed for geolocation, in addition to time synchronization data, such as the Unix time when signals and messages were sent to the control center.

Among the messages and signals sent to the control center, the processor 10 prioritizes the sending of those that result in the actuation of an alarm in the control center, such as: the signal of device violation 300; the bypass signal in the power grid circuit 80; the bypass signal in the power grid circuit 80; a fault signal in the power supply; signal of electrical connections overheating; and a device actuation signal 300 when it is installed. Therefore, if the mobile network or Wi-Fi signal is not available, such signals are sent by SMS.

Man-Machine Interface

As illustrated by FIGS. 1 and 2, the upper portion 1a of the housing of the electrical power management device 300 comprises a man-machine interface, wherein the interface comprises an actuation button 2 of the device 300, and a plurality of Light Emitting Diodes 3, 4, 5, 6 and 7 (LEDs) indicative of different states of the electrical power management device 300.

The actuation button 2 is used only once, when the device 300 is in a provisioned operating mode. For this, the actuation button is pressed for about 5 seconds.

As for the plurality of LEDs 3, 4, 5, 6 and 7, a first electrical current LED indicator 3 has its operation linked to the opto-coupler sensor, and when lit, it indicates to the user that the power grid circuit 80 is energized.

A second active source LED indicator 4 has its function linked to the source. When lit, it indicates to the user that the power supply is on and operational, and when off, it indicates that there is a fault in the power supply.

A third operating mode LED indicator 5 is controlled by the processor 10, and its behavior is linked to different operating modes that the device 300 is in, such as a default operating mode, the provisioned operating mode; a homologated operating mode and the normal operating mode. In any of the operating modes, when the third operating mode LED indicator 5 is flashing, it indicates that the device 300 is operating, and when the third operating mode LED indicator 5 is off, it indicates that the device 300 is operating. in low power operating mode.

A fourth fault LED indicator 6 is controlled by the processor, and its behavior is linked to the previously mentioned operating modes, being responsible for indicating errors in the operation of the device 300. For the default operating mode, the fourth fault LED indicator 6 will be always off. For provisioned operating mode, when the fourth fault LED indicator 6 is lit, it indicates that the protective cover 100 has been opened, and when off, it indicates that the protective cover 100 has been closed, or that the device 300 is in low power operation, if the first electrical current LED indicator 3 is off. For both homologated and normal operating modes, the fourth fault LED indicator 6 will always be off, indicating that there are no errors, or that the device 300 is in low power operating mode, if the first electrical current LED indicator 3 is off. In a violated operating mode, when the fourth fault LED indicator 6 is flashing, it indicates that the protective cover 100 has been lifted, or that the temperature of the electrical connections 32a, 32b, 32c, 32d, 32e is too high, or that there is a fault in the source.

A fifth network LED indicator 7 is controlled by the processor, and in all operating modes, the behavior is the same, that is, when the fifth network LED indicator 7 is lit, the device is connected to the internet, when flashing, it is in communication with the control center, and when off, it indicates that the device is not connected to the internet, or that the device 300 is not powered.

Figure 4:
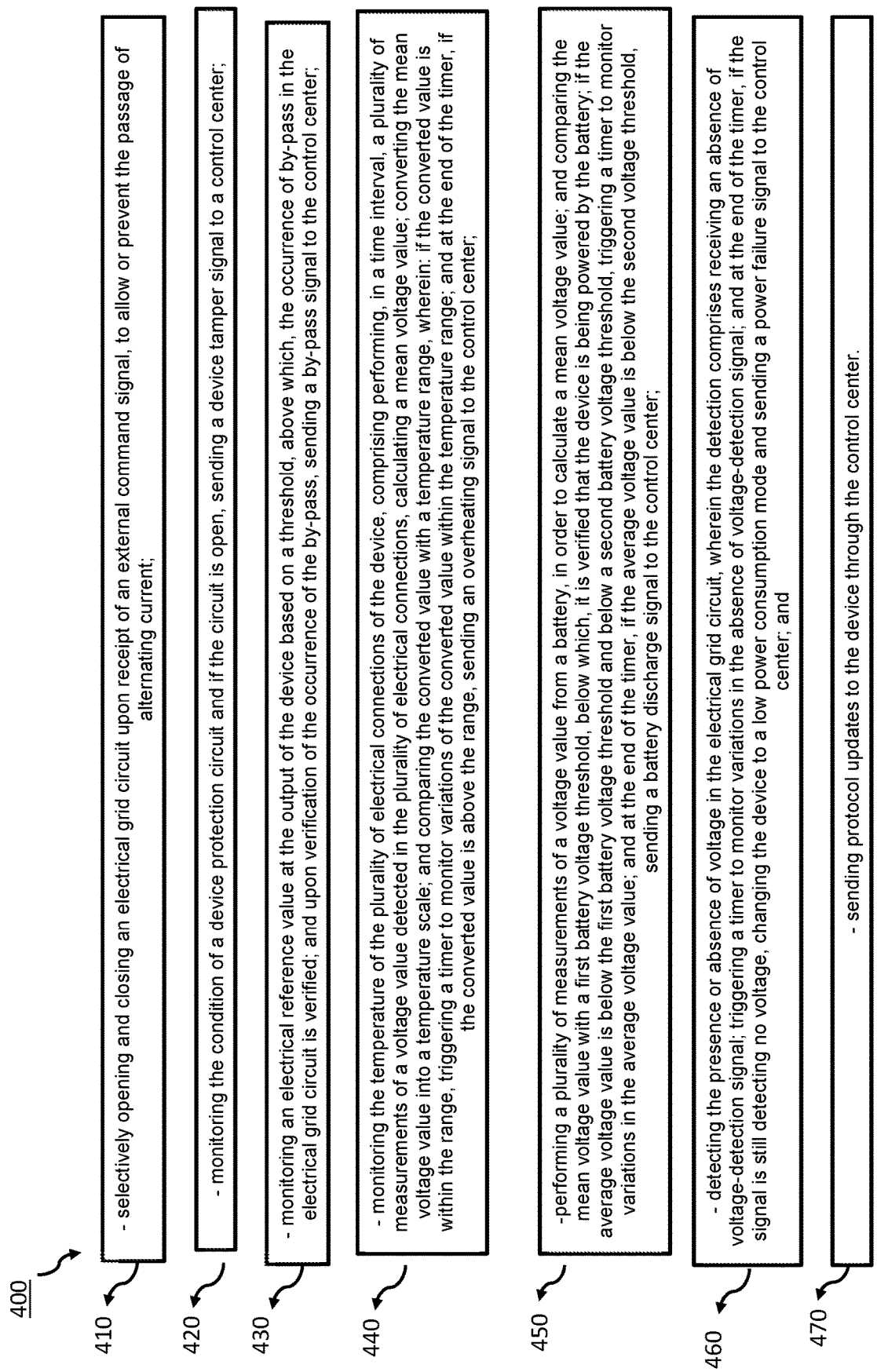
FIG. 4 illustrates the steps of the power management method 400, according to one embodiment of the present invention.

As illustrated in FIG. 4, the present invention also discloses a method for management of electrical power 400 of an electrical power generation system 50, wherein the electrical power generation system 50 provides a source of alternating current AC to an electrical power generation device 300 through a power grid circuit 80. The method comprises the steps of: selectively 410 opening and closing the power grid circuit 80 upon receipt of an external command signal, to allow or prevent the passage of alternating current; and monitoring 420 the condition of a protective circuit of the device 300 and if the circuit is open, sending a tamper signal from the device 300 to a control center; monitoring 430 an electrical reference at the output of the device 300 to identify the occurrence of bypass in the power grid circuit 80.

According to the method 400 described, the step of monitoring 430 the electrical reference comprises monitoring a value of the electrical reference, based on a threshold, for which above this, the occurrence of by-pass in the power grid circuit 80 is found; and upon verification of the occurrence of a bypass in the power grid circuit 80, a bypass signal is sent to the control center.

The method 400 further comprises the step of monitoring 440 the temperature of the plurality of electrical connections 32a, 32b, 32c, 32d, 32e of the device 300, comprising:
  performing, in a time interval, a plurality of measurements of a voltage value detected in the plurality of electrical connections 32a, 32b, 32c, 32d, 32e, calculating a mean voltage value; converting the mean voltage value into a temperature scale; and comparing the converted value with a temperature range, wherein if the converted value is within the range, a timer is triggered to monitor variations of the converted value, within the temperature range; and at the end of the timer, if the converted value is above the range, an overheating signal is sent to the control center.

The described method 400 further comprises the steps of: performing 450 a plurality of measurements of a voltage value from a battery 15 in order to calculate a mean voltage value; and comparing the mean voltage value with a first voltage threshold of the battery 15, below which, it is verified that the device 300 is powered by the battery 15. If the mean voltage value is below the first voltage threshold of the battery 15 and below a second voltage threshold of the battery 15, a timer is triggered to monitor variations in the mean voltage value, and at the end of the timer, if the mean voltage value is below the second voltage threshold, a battery discharge signal 15 is sent to the control center.

The method 400 also comprises the steps of: detecting 460 the presence or absence of voltage in the power grid circuit 80, wherein the detection comprises: receiving an absence of voltage-detection signal; triggering a timer to monitor variations of the absence of voltage-detection signal; and at the end of the timer, if the signal is still detecting absence of voltage, changing the device 300 to a low power mode and send a power failure signal to the control center.

The external command signal according to the method 400 is based on one of: GSM; LTE 4G; CatM1, Nb-IoT, and Wi-Fi, wherein the external command signal is an SMS sent by an authorized mobile number or a command via internet connection.

Finally, the method 400 further comprises the step of sending 470, to the device 300, through the control center, updates of a set of instructions stored in a machine-readable memory.

Although the description of the particular embodiments above makes reference to certain embodiments, the present invention may present modifications in its form of implementation, so that the scope of protection of the invention is limited solely by the content of the appended claims, including therein the possible equivalent variations.

| LIST OF NUMERICAL REFERENCES | |
|---|---|
| Electric power management device | 300 |
| Electric power management method | 400 |
| Control unit; Processor | 10 |
| Data reception and transmission module | 20 |
| Switching element; Latch type relay | 30a, 30b |
| Electrical connections; Electrical contact terminals | 32a to 32e |
| Battery | 15 |
| Protective cover | 100 |
| Flange | 110 |
| Electric telemetry sensors; STPM33 | 40a, 40b |
| Current transformer | 31a, 31b |
| Selectively open and close the power grid circuit | 410 |
| Monitoring the condition of a protection circuit | 420 |
| Monitoring an electrical reference at the device output | 430 |
| Monitoring the temperature of the plurality of electrical connections | 440 |
| Performing a plurality of measurements of a voltage value from a battery | 450 |
| Detecting the presence or absence of voltage in the power grid circuit | 460 |
| Sending updates to the device via the control center | 470 |
| Electric power generation system | 50 |
| Power grid circuit | 80 |
| Power distribution grid | 70 |
| Inverter | 60 |
| Housing; upper portion | 1st |
| Housing; lower portion | 1b |
| Communication port; RS-485 | 45 |
| Access to electrical connections | 23a to 23e |
| Actuation button | 2 |
| Electric current LED indicator | 3 |
| Active source LED indicator | 4 |
| Operating mode LED indicator | 5 |
| Fault LED indicator | 6 |
| Network LED indicator | 7 |

The invention claimed is:

1. A power management device (300) for a power generation system (50) that provides a source of alternating current to the device (300) through a power grid circuit (80), the device (300) comprising:
    a control unit (10);
    a data transmission and reception module (20) for receiving an external command signal; and
    at least one switching element (30a, 30b);
        wherein the control unit (10) actuates the at least one switching element (30a, 30b) so as to selectively open and close the power grid circuit (80) upon receiving the external command signal to allow or prevent the passage of alternating current.

2. The device (300) according to claim 1, wherein the control unit (10):
    monitors an electrical reference at the output of the device (300) to identify the occurrence of by-pass in the power grid circuit (80) when the power grid circuit (80) is open.

3. The device (300) according to claim 2, wherein the control unit (10):
    monitors a value of the electrical reference, based on a threshold, above which, the occurrence of by-pass in the power grid circuit (80) is verified; and upon verification of the occurrence of by-pass in the power grid circuit (80), the control unit (10) actuates the data transmission and reception module (20) to send a by-pass signal to a control center.

4. The device (300) according to claim 2, wherein the electrical reference is one of: voltage, current, and power.

5. The device (300) according to claim 4, wherein the threshold is 50 Volts when the electrical reference is voltage (V).

6. The device (300) according to claim 2, wherein the monitoring of the electrical reference at the output of the device (300) is based on an anti-islanding protection of an inverter (60), which is part of the power generation system (50), wherein the inverter (60) provides the source of alternating current for the device (300).

7. The device (300) according to claim 1 comprising temperature sensors for monitoring the temperature of a plurality of electrical connections (32a, 32b, 32c, 32d, 32e) of the device (300)).

8. The device (300) according to claim 7, wherein the temperature sensors are thermistors with negative voltage coefficient.

9. The device (300) according to claim 7, wherein the control unit (10):
    performs a plurality of measurements of a voltage value and calculating a mean voltage value in a time interval.

10. The device (300) according to claim 9, wherein the control unit (10):
    converts the mean voltage value into a temperature scale; and
    compares the converted value with a temperature range, wherein:
        if the converted value is within the range, the control unit (10) triggers a timer to monitor variations of the converted value within the temperature range; and
        at the end of the timer, if the converted value is above the range, the control unit (10) actuates the data transmission and reception module (20) to send an overheating signal to the control center.

11. The device (300) according to claim 1, wherein the device is selectively powered by a battery (15) or by a source from the power grid circuit (80), wherein the control unit (10):
    performs a plurality of measurements of a voltage value from the battery (15) in order to calculate a mean voltage value in a time interval; and
    compares the mean voltage value with a first battery voltage threshold (15), below which, it is verified that the device (300) is being powered by the battery (15).

12. The device (300) according to claim 1 comprising an opto-coupler associated with the control unit (10) that sends a signal to the control unit (10) to the detect the presence or absence of voltage in the power grid circuit (80).

13. The device (300) according to claim 1, wherein the at least one switching element (30a, 30b) is a relay (30a, 30b) of the latch type, wherein at least one transformer current (31a, 31b) is secured to at least one relay (30a, 30b).

14. The device (300) according to claim 1, wherein the external command signal is based on one of: GSM; LTE 4G; CatM1; Nb-IoT; and Wi-Fi, wherein the external command signal is an SMS sent by an authorized mobile number or a command via internet connection.

15. A power management method (400) of a power generation system (50) that provides an alternating current source to a power management device (300) through a power grid circuit (80), wherein the method (400) comprises:
- selectively (410) opening and closing the power grid circuit (80) upon receipt of an external command signal, to allow or prevent the passage of alternating current; and
- monitoring (420) the condition of a device protection circuit (300) and if the circuit is open, sending a device tamper signal (300) to a control center.

16. The method (400) according to claim 15, further comprising:
- monitoring (440) the temperature of the plurality of electrical connections (32a, 32b, 32c, 32d, 32e) of the device (300) by:
  - performing, in a time interval, a plurality of measurements of a voltage value detected in the plurality of electrical connections (32a, 32b, 32c, 32d, 32e), calculating a mean voltage value;
  - converting the mean voltage value into a temperature scale; and
  - comparing the converted value with a temperature range, wherein:
    - if the converted value is within the range, triggering a timer to monitor variations of the converted value within the temperature range; and
    - at the end of the timer, if the converted value is above the range, sending an overheating signal to the control unit.

17. The method (400) according to claim 15, further comprising:
- performing (450) a plurality of measurements of a voltage value from a battery (15) to calculate a mean voltage value; and
- comparing the mean voltage value with a first battery voltage threshold (15), below which, it is verified that the device (300) is being powered by the battery (15); if the mean voltage value is below the first battery voltage threshold (15) and below a second battery voltage threshold (15), triggering a timer to monitor variations in the mean voltage value; and
- at the end of the timer, if the mean voltage value is below the second voltage threshold, sending a battery discharge signal (15) to the control center.

18. The method (400) according to claim 15, further comprising:
- detecting (460) the presence or absence of voltage in the power grid circuit (80), wherein the detection comprises:
  - receiving an absence of voltage-detection signal;
  - triggering a timer to monitor variations in the absence of voltage-detection signal; and
  - at the end of the timer, if the signal is still detecting the absence of voltage, changing the device (300) to a low power consumption mode and sending a power failure signal to the control center.

19. A power management method (400) of a power generation system (50) that provides an alternating current source to a power management device (300) through a power grid circuit (80), wherein the method (400) comprises:
- selectively (410) opening and closing the power grid circuit (80) upon receipt of an external command signal, to allow or prevent the passage of alternating current; and
- wherein the external command signal is based on one of: GSM; LTE 4G; CatM1; Nb-IoT; and Wi-Fi, wherein the external command signal is an SMS sent by an authorized mobile number or a command via internet connection.

* * * * *